3,047,623
METHOD OF PRODUCING BORON-
CONTAINING COMPOUNDS
John E. Milks, Stamford, Conn., assignor to American Cyanamid Company, New York, N.Y., a corporation of Maine
No Drawing. Filed Sept. 15, 1960, Ser. No. 56,122
8 Claims. (Cl. 260—551)

This invention relates to a method of producing boron-containing compounds, more particularly heterocyclic boron-containing compounds and specifically diazoborolines, for example, 2-phenyl-1,3,2-benzodiazoboroline, the formula for which is (I) 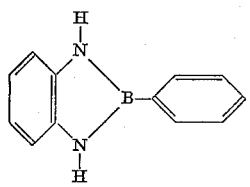

Still more particularly the invention is concerned with the method of producing a diazoboroline which comprises reacting together (1) a hydrocarbon diamine having at least one hydrogen atom attached to each amino nitrogen atom with (2) a polyaminoborane selected from the group consisting of diaminoboranes represented by the general formula (II) 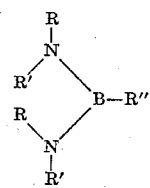

and triaminoboranes represented by the general formula (III) 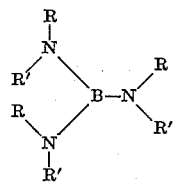

in which formulas R represents a lower alkyl radical, R' represents a member of the group consisting of hydrogen and lower alkyl radicals and R" represents a hydrocarbon radical.

The hydrocarbon diamine reactant of (1), supra, may be represented by the general formula (IV) 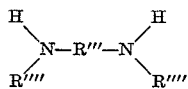

wherein R''' represents a divalent hydrocarbon radical, preferably one containing at least 2 carbon atoms, e.g., from 2 to 26 carbon atoms, and more particularly from 3 to 18 carbon atoms; and each R'''' represents a monovalent hydrocarbon radical. Illustrative examples of divalent hydrocarbon radicals represented by R''' in Formula IV are ethylene, propylene (trimethylene), isopropylene, butylene to octadecylene (both normal and isomeric forms thereof), and the corresponding divalent olefinically unsaturated aliphatic hydrocarbon radicals, including propenylene, butenylene, pentenylene, etc.; as well as other divalent saturated and unsaturated aliphatic hydrocarbon radicals, including cyclopentylene, cyclopentenylene, cyclohexylene, cyclohexenylene, cycloheptylene, etc.; divalent aromatic hydrocarbon radicals, e.g., phenylene, naphthylene, biphenylene, etc.; divalent aliphatic hydrocarbon-substituted aromatic hydrocarbon radicals, e.g., 2,4-tolylene, xylylene, ethyl 2,5-phenylene, vinyl 2,4-phenylene, allyl 2,5-phenylene, propyl 2,4-phenylene, isopropyl 3,4-phenylene, 1-butyl 2,4-naphthylene, etc.; divalent aromatic hydrocarbon-substituted aliphatic hydrocarbon radicals, e.g., phenylethylene, phenylpropylene, phenylbutylene, naphthylethylene, naphthylisobutylene, etc.; as well as radicals that may be classed either as divalent aliphatic hydrocarbon-substituted aromatic hydrocarbon radicals or divalent aromatic hydrocarbon-substituted aliphatic hydrocarbon radicals, e.g., 4-alpha-tolylene, 3-beta-phenyleneethyl, 4-alpha-xylylene, 2-gamma-phenylenebutyl, etc.

Illustrative examples of monovalent hydrocarbon radicals including those represented by R'''' in Formula IV are alkyl (including cycloalkyl), alkenyl (including cycloalkenyl), aralkyl, aralkenyl, aryl, akaryl and alkenylaryl radicals. More specific examples of such radicals are methyl, ethyl, propyl, isopropyl, butyl, isobutyl, sec.-butyl, amyl, isoamyl, hexyl to octadecyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, etc.; phenyl, biphenylyl or xenyl, naphthyl, etc.; tolyl, xylyl, ethylphenyl, propylphenyl, isopropylphenyl, butylphenyl, allylphenyl, etc.; and vinyl, allyl, methallyl, propenyl, isopropenyl (beta-allyl), 1-butenyl, 2-butenyl (crotyl), 3-butenyl, pentenyl, hexenyl, butadienyl, etc.

Illustrative examples of lower alkyl radicals represented by R and R' where they appear in each of Formulas II and III are methyl, ethyl, propyl, isopropyl, n-butyl, isobutyl, sec.-butyl, tert.-butyl and the normal and various isomeric amyl radicals.

The molar proportions of reactants may be considerably varied, but ordinarily the hydrocarbon diamine and the polyaminoborane are employed in approximately equal molar proportions. (Variations of, say, 0.01 mole percent to 10 mole percent of either reactant in excess of the other are intended to be included by the expression "approximately equal molar proportions.") When such molar proportions are used and the polyaminoborane is a triaminoborane of the kind represented by Formula III, then the diazoboroline obtained as a product of the reaction contains an unreacted —NRR' grouping attached to the boron atom if carried out at a sufficiently low temperature, e.g., about 35°–45° C., and when two and only two moles of the by-product amine have been evolved; or, if carried out at a higher temperature, e.g., about 70°–80° C., will yield, after three moles of the by-product amine have been evolved, a tris(benzo-1,3,2-diazoborolo)-borazine having the structural formula (V) 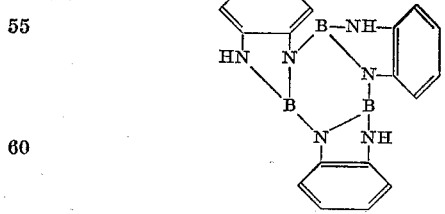

The reaction can be carried out in the presence or absence of an inert (substantially inert), liquid reaction medium, more particularly a solvent, e.g., benzene, depending upon the compatibility of the reactants. By "inert" or "substantially completely inert" liquid reaction medium is meant a liquid medium which is so inert or non-reactive toward the reactants and the reaction product that it will not affect the course of the reaction or the constitution of the reaction product. By "liquid medium" is meant a medium which is liquid at the temperature employed in effecting the reaction. In other words, the liquid material used, as desired or as may be required, as a medium in which the reaction is effected may or may not be liquid at room temperature or at any other temperature below the reaction temperature. If a liquid reaction medium is employed, it is preferable to use one which is volatile (volatilizable) without decomposition.

The reaction surprisingly proceeds at relatively low temperatures. In many cases the reaction can be carried out at room temperature (20°–30° C.). Usually the reaction is carried out at a somewhat higher temperature, e.g., at from about 35° C. to about 80° C. Higher temperatures may be used as desired or as conditions may require, for example up to 150° or even 200° C., depending, for instance, upon the particular starting reactants employed.

The synthesis of the diazoboroline having the formula shown in Formula I by the reaction of o-phenylenediamine and phenylboron dichloride has been described by Dewar et al., J. Chem. Soc. 3076 (1958). Another method of preparation of this same compound consists in reacting o-phenylenediamine with phenylboronic acid or in heating o-phenylenediamine with an ester of phenylboronic acid in an inert solvent [Letsinger and Hamilton, J.A.C.S. 80, 5411 (1958)].

Taking o-phenylenediamine as illustrative of the hydrocarbon diamine and bis(dimethylamino)phenylborane as illustrative of the polyaminoborane, the preparation of the diazoborolines in accordance with the method of the present invention may be illustrated by the following (VI)

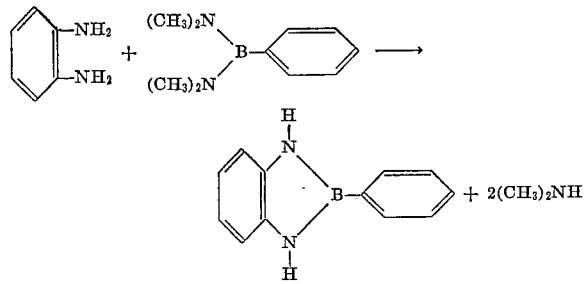

Ordinarily, the polyaminoborane and the hydrocarbon diamine reactants are selected so that the alkyl amine evolved as a by-product of the reaction has a higher volatility (lower boiling point) than the hydrocarbon diamine reactant.

The transamination reaction between a hydrocarbon diamine and a polyaminoborane in accordance with the present invention, and which is illustrated in Equation VI, has the advantage over the prior-art methods that almost quantitative yields of the heterocyclic boron compounds can be obtained at low reaction temperatures. This is a matter of considerable practical and economic importance as will be readily understood by those skilled in the art. A further advantage resides in the fact that an excess of the hydrocarbon diamine is not required in the reaction mixture, which is in marked contrast to the prior-art methods wherein hydrogen chloride gas was produced (Dewar et al., supra) and which results in the consumption of a large part of the reactants in salt formation.

In order that those skilled in the art may better understand how the present invention can be carried into effect, the following examples are given by way of illustration and not by way of limitation. All parts and percentages are by weight unless otherwise stated.

*Example 1*

To a suspension of 28.8 g. (0.267 mole) of o-phenylenediamine in 400 ml. of benzene is added 47 g. (0.267 mole) of bis(dimethylamino)phenylborane in 200 ml. of benzene. At room temperature (20°–30° C.) the reactants dissolve and dimethyl amine is evolved. After refluxing for 1½ hours, the solution is cooled, and the product, 2-phenyl-1,3,2-benzodiazaboroline, is collected by filtration. Yield, 34 g. (65% of theory); M.P. 209°–210° C. The mother liquor is evaporated to dryness to leave a residue, 17 g., comprising the remainder of the product. The total yield, 51 g., of the diazoboroline is almost quantitative.

*Example 2*

Example 1 is repeated exactly but using 0.267 mole of bis(monomethylamino)phenylborane, $(CH_3NH)_2BC_6H_5$ instead of 0.267 mole of bis(dimethylamino)phenylborane. In this case, the by-product of the reaction is methyl amine (monomethyl amine). In this example, too, the yield of 2-phenyl-1,3,2-benzodiazoboroline, the structural formula for which is given in Formula I, is almost quantitative.

*Example 3*

A benzene solution of 2,3-diaminonaphthalene and bis(dimethylamino)phenylborane in approximately equimolar amounts is heated for 2½ hours under reflux. The concentration of the reactants in the benzene is about 20% by weight. The solution is evaporated to dryness and the product, 2-phenyl-1,3,2-naphthodiazoboraline, is crystallized from a small amount of xylene. Yield, 93% of theory; M.P. 327°–328° C.

*Example 4*

The same procedure is followed as described under Example 3 with the exception that the hydrocarbon diamine which is reacted with 2,3-diaminonaphthalene is bis(diethylamino)-tolylborane. The product, 2-tolyl-1,3,2-naphthodiazoboroline, is obtained in almost quantitative yield. The by-product of the reaction is diethylamine.

*Example 5*

Example 4 is repeated using toluene instead of benzene as the inert, liquid reaction medium. Similar results are obtained.

*Example 6*

Same as in Example 1 with the exception that instead of 47 g. of bis(dimethylamino)phenylborane there is used as equivalent molar amount of bis(dimethylamino)-n-butylborane. The product, 2-n-butyl-1,3,2-benzodiazoboroline, is obtained in almost a quantitative yield.

*Example 7*

The same procedure is followed as described under Example 1 with the exception that an equivalent amount of tris(dimethylamino)borane is used instead of bis(dimethylamino)phenylborane. The reaction mixture is refluxed for four hours to evolve 3 moles of dimethylamine. The product (see Formula V for its structure) is isolated by filtration, washed with benzene and dried.

*Example 8*

Equal molar proportions of ethylene diamine and bis(diethylamino) phenylborane are heated together at 100° C. under an atmosphere of dry nitrogen gas until diethylamine is no longer evolved. The product has the formula (VII)

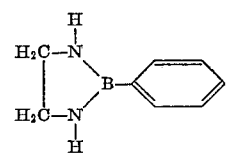

The product is obtained in almost quantitative yield.

It will be understood, of course, by those skilled in the art that the invention is not limited to the specific reactants, or to the particular inert liquid reaction medium, or to the other specific condtions of reaction given by way of illustration in the above illustrative examples. Thus, instead of the particular hydrocarbon diamine employed in the individual examples there can be used any other hydrocarbon diamine having at least one hydrogen atom attached to each amino nitrogen, numerous examples of which will be apparent from a consideration of Formula IV and the examples of divalent hydrocarbon radicals represented by R''' and of monovalent hydrocarbon radicals represented by R'''' appearing in said Formula IV. Also, instead of the particular polyaminoborane used in the individual example, there can be employed any diaminoborane embraced by Formula II or any triaminoborane embraced by Formula III. Numerous examples of such aminoboranes will be apparent from a consideration of the aforesaid formulas and from the examples of lower alkyl radicals represented by R and R' that appear therein.

Likewise, inert liquid reaction media other than benzene and toluene, which were used in most of the aforementioned illustrative examples, can be employed. Thus, one can use xylene or other liquid aromatic hydrocarbons; various oxygenated compounds, e.g., dioxane, diethyl, diisopropyl, dipropyl, dibutyl and other dialkyl ethers, 1,2-dimethoxy ethane, 1,2-diethoxy ethane, etc.; or various halogenated (including chlorinated) compounds, e.g., chloroform, carbon tetrachloride, chlorobenzenes, fluorobenzenes, etc. The inert, liquid reaction medium, if employed, can be used in any suitable amount, e.g., from 0.1 to 40 or 50, or more, times that of the combined weight of the primary reactants (hydrocarbon diamine plus polyaminoborane).

The products resulting from the method of this invention are particularly useful as fuel additives and as rocket fuels or as components thereof.

I claim:
1. The method which comprises effecting a transamination reaction, at a temperature within the range of from 20° C. to 200° C., between (1) a hydrocarbon diamine represented by the formula

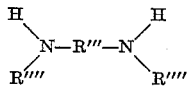

wherein R''' represents a divalent hydrocarbon containing from 2 to 26 carbon atoms and wherein any unsaturation between adjacent carbon atoms is solely double bonded, and R'''' represents a monovalent hydrocarbon containing from 1 to 18 carbon atoms and wherein any unsaturation between adjacent carbon atoms is solely double-bonded and (2) a polyaminoborane selected from the group consisting of diaminoboranes represented by the formula

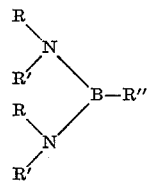

and triaminoboranes represented by the formula

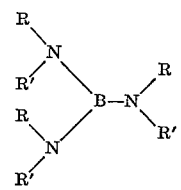

in which formulas R represents lower alkyl, R' represents a member of the group consisting of hydrogen and lower alkyl, and R'' represents a monovalent hydrocarbon containing from 1 to 18 carbon atoms and wherein any unsaturation between adjacent carbon atoms is solely double-bonded, the hydrocarbon diamine of (1) and the polyaminoborane of (2) being employed in approximately equal molar proportions and being so selected that the alkyl amine evolved as a by-product of the reaction has a higher volatility than the hydrocarbon diamine reactant; and continuing the said reaction until all of the by-product alkyl amine has been evolved when the polyaminoborane is a diaminoborane of the above-defined kind and until from 2 to 3 moles of by-product alkyl amine have been evolved when the polyaminoborane is a triaminoborane of the above-defined kind, the resulting transamination product comprising a diazoboroline formed from the hydrocarbon diamine of (1)) and the polyaminoborane of (2).

2. A method as in claim 1 wherein the reaction is effected in the presence of an inert, liquid reaction medium.

3. The method of producing 2-phenyl-1,3,2-benzodiazoboroline which comprises reacting together, at a temperature of from 20° C. to about 80° C., approximately equal molar proportions of o-phenylenediamine and bis(dimethylamino)phenylborane, said reaction being effected in an inert, liquid, reaction medium and being continued until all of the by-product dimethylamine has been evolved.

4. A method as in claim 3 wherein the inert, liquid, reaction medium is benzene.

5. A method as in claim 7 wherein the inert, liquid, reaction medium is benzene.

6. A method as in claim 8 wherein the inert, liquid, reaction medium is benzene.

7. The method of producing 2-phenyl-1,3,2-naphthodiazaboroline which comprises reacting together at a temperature of from 20° C. to about 80° C., approximately equal molar proportions of 2,3-diaminonaphthalene and bis(dimethylamino)phenylborane, said reaction being effected in an inert, liquid, reaction medium and being continued all of the by-product dimethyl amine has been evolved.

8. The method of producing 2-n-butyl-1,3,2-benzodiazaboroline which comprises reacting together, at a temperature of from 20° C. to about 80° C., approximately equal molar proportions of o-phenylene-diamine and bis-(dimethylamino)-n-butylborane, said reaction being effected in an inert, liquid, reaction medium and being continued until all of the by-product dimethyl amine has been evolved.

References Cited in the file of this patent

Bergman: The Chemistry of Acetylene and Related Compounds, p. 80 (1948).

Houben-Weyl: Methaden per organischen Chemie, Band XI/I, Stickstoff Verbindungen II (1957), pp. 248–250.

Dewar et al.: Journal Chem. Soc., pp 3076–2079 (1958).

Letsinger et al.: Journal of the Amer. Chem. Soc., vol. 80, pp. 5411–5413 (1958).

UNITED STATES PATENT OFFICE
CERTIFICATE OF CORRECTION

Patent No. 3,047,623                            July 31, 1962

John E. Milks

It is hereby certified that error appears in the above numbered patent requiring correction and that the said Letters Patent should read as corrected below.

Column 2, lines 12 to 14, for "4-alpha-tolylene, 3-beta-phenyleneethyl, 4-alpha-xylylene, 2-gamma-phenylenebutyl," read -- 4,alpha-tolylene, 3,beta-phenyleneethyl, 4,alpha-xylylene, 2,gamma-phenylenebutyl, --; line 18, for "akaryl" read -- alkaryl --; column 5, line 3, for "condtions" read -- conditions --; lines 52 and 53, for "double bonded" read -- double-bonded --; column 6, line 26, for "(1))" read -- (1) --; line 50, before "all" insert -- until --; same column 6, line 67, for "3076-2079" read -- 3076-3079 --.

Signed and sealed this 18th day of December 1962.

(SEAL)
Attest:

ERNEST W. SWIDER
Attesting Officer

DAVID L. LADD
Commissioner of Patents